Dec. 22, 1964    J. W. VAN ALLEN    3,162,475
FOOD HANDLING IMPLEMENT
Filed May 9, 1961
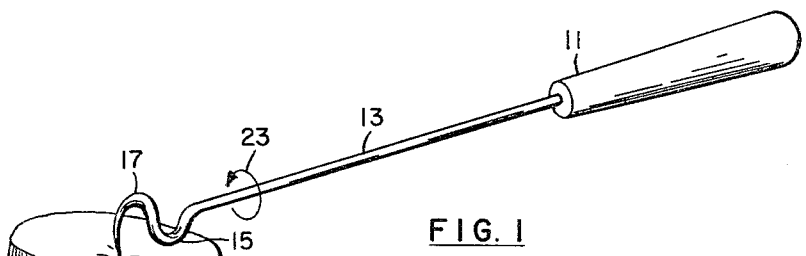
FIG. 1
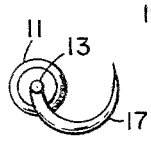    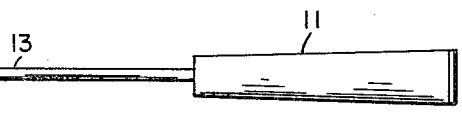
FIG. 3    FIG. 2
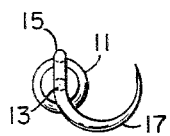    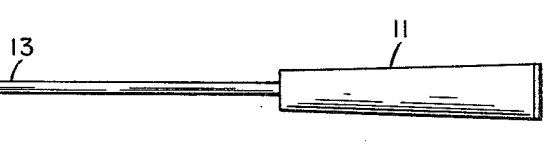
FIG. 5    FIG. 4
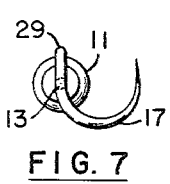    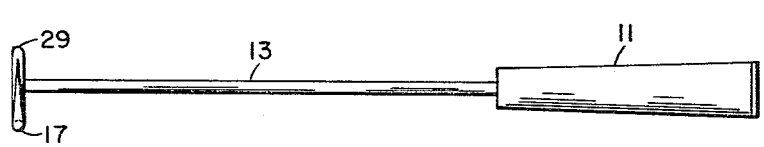
FIG. 7    FIG. 6
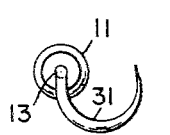    
FIG. 9    FIG. 8
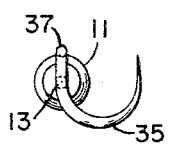    
FIG. 11    FIG. 10
INVENTOR.
JOHN W. VAN ALLEN
BY
*Flehr and Swain*
ATTORNEYS United States Patent Office 3,162,475
Patented Dec. 22, 1964

3,162,475
FOOD HANDLING IMPLEMENT
John W. Van Allen, Box 803, Tahoe City, Calif.
Filed May 9, 1961, Ser. No. 108,917
3 Claims. (Cl. 294—26)

This invention relates generally to barbecue implements and more particularly to barbecue implements of the tine type.

Since nearly the beginning of our civilization an implement known as the fork has been in existence which has been used primarily as an eating utensil. The fork has been so well accepted as an eating utensil that variations of this utensil have been utilized in almost every area where food products are handled. Consequently, when barbecuing and charcoal broiling became popular throughout this country the fork was again redesigned to be the normal implement.

However, the fork has certain inherent characteristics which preclude it from being the ideal implement. Often, especially when used with a well greased charcoal grill, the fork must be driven into the meat almost vertically in order to firmly impail the meat without pushing it off the grill itself. This vertical orientation of the fork, of course, requires that the user's hand be directly above the flames and very often exposed to high heat. Moreover, it is often quite difficult to withdraw the fork once the meat or other food product is impaled thereon. In this respect it is frequently required that a second utensil be employed to remove the meat from the fork.

It is, therefore, a general object of this invention to provide an improved food handling implement.

It is a more particular object of this invention to provide an improved food handling implement, which is particularly useful in barbecuing and broiling.

It is still another object of this invention to provide an implement having the aforementioned characteristics which may be employed with the user's hand horizontally spaced from the food or other product to be manipulated and thus well removed from any flame.

It is still another object of this invention to provide an implement in accordance with the aforementioned objects in which the food or other material may be easily applied and withdrawn from the implement itself.

It is another object of this invention to provide a food handling implement having the aforementioned characteristics in which means are provided for preventing food or other products from riding freely along the shaft.

It is still another object of this invention to provide an implement of the aforementioned characteristics by which means are provided to stabilize the food on the implement itself.

The above mentioned objects are generally accomplished by the provision of an elongated shaft having a preferably semicircular pointed hook at the end thereof disposed in a plane approximately perpendicular to the shaft. In addition, means are provided on the shaft in a proximity of the hook to prevent the meat or other product from riding along the shaft.

The invention may be more clearly and particularly understood when a review of the following description in conjunction with the accompanying drawing is made, in which:

FIGURE 1 is a perspective view of the preferred embodiment of this invention;

FIGURE 2 is a side elevational view of another embodiment of this invention wherein a hook is displaced from the end of the shaft;

FIGURE 3 is a front elevational view of the embodiment shown in FIGURE 2;

FIGURE 4 is a side elevational view of an implement in accordance with another embodiment of this invention;

FIGURE 5 is a front elevational view of the embodiment shown in FIGURE 4;

FIGURE 6 is a side elevational view of still another embodiment of this invention wherein the shaft is joined to the hook portion intermediate the ends of the hook portion;

FIGURE 7 is a front elevational view of the embodiment shown in FIGURE 6;

FIGURE 8 is a side elevational view of still another embodiment of this invention showing a plurality of hooks;

FIGURE 9 is a front elevational view of the embodiment shown in FIGURE 8;

FIGURE 10 is a side elevational view of another embodiment of this invention employing a plurality of hooks; and FIGURE 11 is a front elevational view of the embodiment shown in FIGURE 10.

Referring particularly to FIGURE 1, it is seen that the implement includes a handle 11 which may be made of wood or some other convenient material, having an axially extending shaft 13. An approximately semicircular arcuate portion 15 is disposed at the end of the shaft 13 in a plane including the shaft itself. A hook portion or hook 17 extends from the termination of the arcuate portion 15. The hook 17 is likewise arcuate and approximately semicircular in form including a pointed end 19. The hook 17 is disposed in a plane approximately perpendicular to the shaft 13.

In use the implement may be placed over a piece of meat 21 or other material in a manner as shown in the FIGURE 1 with the semicircular portion 15 and the point 19 lying across the meat 21. By rotating the implement in a direction shown by the arrow 23 the hook 17 is driven into the meat 21 with the semicircular portion 15 acting as a fulcrum.

After driving the hook 17 through the meat the side face of the semicircular portion 15 and one side of the hook portion 17 lie adjacent to the surface of the meat thereby providing a stabilizing effect. Moreover, the semicircular portion 15 provides a tortious path for the meat to thereby prevent it from riding up along the shaft 13 toward the handle 11.

With the meat thus impaled on the hook 17 it may be turned or moved about with ease. When it is desired to remove the meat from the hook 17 it is merely required to reverse the rotation of the implement from that as shown by the arrow 23 and again the semicircular portion 15 serves as a fulcrum to provide positive removal of the hook. It will be noted that this removal action may be accomplished whether the implement is above or below the meat, as it will be the case in turning the meat from one side to the other.

Referring to FIGURES 2 and 3, another embodiment of the invention is shown wherein the semicircular portion 15 is not included. In the embodiment shown in FIGURE 2 the hook portion 17 is joined to the shaft 13 intermediate the ends thereof. Thereby providing an extension 13' of the shaft 13 beyond the hook 17. The extension 13' serves to prevent the meat from sliding along the shaft. In this instance the shaft itself serves as a fulcrum for insertion and removal of the hook.

FIGURES 4 and 5 show still another embodiment of the invention very similar to that shown in FIGURE 1 wherein the semicircular portion 15 is included. In this instance, however, the shaft extends across semicircular portion 15 wherein two points of attachment 25 and 27 are employed between the semicircular portion 15 and the shaft 13. In this instance, the semicircular portion 15 again provides means to prevent meat from passing along the shaft 13 and also provides a fulcrum for insertion and removal of the hook 17.

In the embodiment shown in FIGURES 6 and 7, the hook portion 17 is again joined to the end of the shaft 13. Here, however, the hook 17 includes an extended portion 29 which passes beyond the end of the shaft 13. In this instance the portion 29 serves as means to prevent the meat from passing along the shaft and also serves as the fulcrum for insertion and removal.

The embodiment shown in FIGURES 8 and 9 is similar to that shown in FIGURES 2 and 3 with the exception of an additional hook portion 31 which is included at the end of the shaft extension 13'. Thus, in the embodiment shown in FIGURES 8 and 9 two hooks are provided and the implement may be utilized on foods having lesser densities than meat and the like. Thus, the embodiment shown in FIGURES 8 and 9 may be utilized for spaghetti, salads, fruit and the like.

The embodiments shown in FIGURES 10 and 11 also include a plurality of hook portions 33 and 35 joined by a semicircular section 37. Here the portion 37 prevents the meat from sliding along the shaft 13 and also provides a fulcrum for insertion and removal of the hooks 33 and 35.

Thus, it is seen that an improved food handling implement is provided which has utility in numerous applications. While the invention has been described primarily as a barbecue implement it should be realized that it is fully capable of other uses and that its advantages are apparent in other applications as well, such as in the handling of any solid product.

I claim:

1. A food handling implement comprising a handle, an elongated shaft extending therefrom, curved hook means secured to the end of said elongated shaft, said curved hook means lying in a plane disposed transversely relative to said elongated shaft and stop means being a continuation of said hook means and secured to said shaft for preventing the food from riding freely along the shaft, said stop means comprising an arcuate section having an end secured to an intermediate section of said shaft and aligned in a plane including said shaft whereby the hook means and the stop means define perpendicular planes such that passage of food from the hook means past the stop means is impeded.

2. A food handling implement comprising a handle having an elongated shaft extending therefrom, curved hook means secured to the end of said shaft, said curved hook means lying in a plane disposed transversely relative to said elongated shaft and stop means secured to said shaft for preventing the food from riding freely along the shaft, said stop means comprising an extension of said hook means beyond said shaft on the opposite side of said shaft from which the hook means lies.

3. A food handling implement comprising a handle, an elongated shaft extending therefrom, a pair of curved hook means secured on the end of said shaft, said pairs of curved hook means lying in spaced parallel planes disposed transversely relative to said elongated shaft and stop means being a continuation of said pairs of curved hook means and secured to said shaft for preventing the food from riding freely along the shaft, said stop means comprising an arcuate section interconnecting said pair of curved hook means and secured to said shaft, said stop means extending beyond said shaft on the opposite side of the shaft from which the hook means lie and aligned in a plane including said shaft whereby said pairs of curved hook means and the stop means define planes such that passage of food from the hook means past the stop means is impeded.

References Cited in the file of this patent

UNITED STATES PATENTS

| | | |
|---|---|---|
| 1,202,120 | Stuckel | Oct. 24, 1916 |
| 1,757,610 | Bergdal | May 6, 1930 |
| 2,604,350 | Taylor | July 22, 1952 |
| 2,873,521 | Cortner | Feb. 17, 1959 |
| 2,882,084 | Eatinger | Apr. 14, 1959 |